3,350,211
COMPOSITIONS USEFUL IN CONTROLLING MARINE FOULING AND METHODS FOR THEIR USE
Bernard W. Greenwald, Bronx, N.Y., assignor to Merck & Co. Inc., Rahway, N.J., a corporation of New Jersey
No Drawing. Filed Dec. 31, 1964, Ser. No. 422,509
6 Claims. (Cl. 106—15)

ABSTRACT OF THE DISCLOSURE

A marine anti-fouling preparation which contains mercury, zinc or lead complexes of 5-substituted-2-(thiazolyl)-benzimidazoles as the active ingredient.

---

The invention relates to novel compositions useful in preventing marine fouling. More particularly, it is directed to compositions containing a metal complex of 2-thiazolyl benzimidazoles and their use in preventing marine growth. It is also concerned with methods for controlling the growth of these marine organisms by use of these novel compositions.

Fouling is that process whereby ships and other objects placed in water become laden with animals, plants, or both by surface attachment. Such fouling is well-known to effect the efficiency of ship propulsion. These growths also interfere with mechanical movement of ship parts, buoys, underwater sound equipment, and salt water pipe systems, and thereby result in increasing fuel consumption, losses in time and increased operation expense.

The animals and plants in the fouling community are normally those naturally occurring in ocean waters, more particularly in the coastal regions. The most common of the foulants are barnacles, tunicates, hydroids, dryozoa, and marine plants but many other sessile or attached forms of animal and vegetable life are also known to cause fouling.

In accordance with the present invention, it has now been found that compounds of the formula

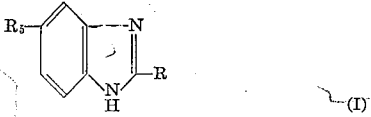

when complexed with a heavy metal cation of mercury (mercuric), zinc, or lead (plumbic) are useful as antifoulants. In the above formula, R is thiazolyl and $R_5$ is hydrogen, alkyl, preferably loweralkyl such as methyl, ethyl, isopropyl and the like, halo for example chlorine or fluorine, phenyl, or a halophenyl group having a halo radical, for example fluoro or chloro, located ortho, meta, or para with respect to the phenyl carbon linking the halophenyl group to the benzimidazole moiety. Examples of such halophenyl groups include p-fluorophenyl, p-chlorophenyl, o-fluorophenyl, m-fluorophenyl, and the like. $R_5$ may also represent heterocyclic radicals such as thienyl and the like, a loweralkoxy or loweralkylthio group such as methoxy, ethoxy, methylthio, propylthio and the like, or a phenoxy or phenylthio group.

It is, therefore, an object of the present invention to provide compositions useful as antifoulants. It is a further object to provide paints and coatings useful in combatting the fouling of ship bottoms. It is also an object to provide methods for combatting the fouling of ships and other objects immersed in water by use of these antifouling compositions. Other objects will become apparent from the following description of the invention.

The active antifoulant complexes of the present invention are prepared by a number of processes. For example, these complexes may be prepared by admixing an aqueous solution of a heavy metal salt such as a metal sulfate, metal nitrate, or metal halide, e.g. metal chloride, with the benzimidazole hydrohalide in water. Upon admixing these ingredients, the desired complex is obtained. The active antifoulants are also obtainable by intimately admixing the benzimidazole free base and the heavy metal salt by use of intimate contact agitation techniques preferably using high shear, for instance ballmilling. This reaction proceeds with liquids acting substantially as solvent or dispersing medium or in the dry state. Solvents which find use in the above process include dimethylsulfoxide, formamide, dimethylformamide, and the like. Dispersing media useful in preparing the complexes described above may be nonpolar and include aromatic hydrocarbons such as xylene and toluene, and aliphatic hydrocarbons such as hexane and heptane and the like, or they may be polar, e.g. water, and loweralkanols such as methanol, ethanol, isopropanol and the like.

A number of the antifoulant complexes described above have been tested for efficacy in bay waters off Miami Beach, Fla. in the following manner: The active complex (2½ g.) is dispersed in 6 ml. of water. A porous carbon block 63 cm. x 63 cm. x 5 cm. is partially submerged in the resulting dispersion and impregnated with substantially all the dispersed complex by air evacuation and immersion. The test block is then submerged in the bay waters and the amount of fouling noted.

| Antifoulant | Percent of Test Area Free of Fouling | |
|---|---|---|
| | 1 month | 4 months |
| Mercuric-2-(4'-thiazolyl)-benzimidazole | 100 | 75 |
| Zinc-2-(4'-thiazolyl)-benzimidazole | [1] 25 | |
| Plumbic-2-(4'-thiazolyl)-benzimidazole | [1] 25 | |
| Control | [2] 5 | |

[1] Barnacles, hydroids and algae attached.
[2] Barnacles, hydroids, algae, tunicates and tube worms attached.

It will be appreciated that the effectiveness of a particular antifoulant composition depends in part both upon the ability of the toxic material to reach the surface of the coating and upon the rate of solution of the toxic material. The life of a toxic coating is therefore often determined by the layer thickness, its reserve store of toxicant, its rate of dissolution and its ability to resist mechanical wearing away. It becomes clear, therefore, that the durability of a coating, its ability to adhere to the surface to which applied, its effect or corrosive tendency toward that surface, its smoothness after application, its ease of application, and its cost as well as its ability to prevent attachment of growth of fouling organisms are all factors to consider in selecting an appropriate antifoulant composition.

According to one aspect of the present invention, the active metal complexes of 2-thiazolyl benzimidazoles may be incorporated into the compositions useful as paints, coatings or other compositions which find use in protecting surfaces from marine fouling. The final composition contains vehicles which may comprise resinous materials such as coal tar (pitch), shellac, vinyl resins such as vinyl chloride, vinyl acetate copolymer, polyvinyl chloride, polyvinyl acetate, or polyvinyl butyral, phenolic resins such as phenol formaldehyde resin, or other binders. The weight percent of carrier or vehicle which finds use in this regard may vary from about 3% to about 40%.

In addition to the paint or surface coating vehicles such as shellac, vinyl chloride and the like, additional ingredients are frequently combined with an appropriate vehicle to insure all or some of the aforementioned desired characteristics. Accordingly, the compositions of this invention may contain rosin or some other suitable resin in sufficient quantities to insure adequate rate of solution of the active ingredients.

Also included in the compositions of this invention are fillers, extenders, driers and other excipients which persons skilled in the art would use to give a desired quality, color, thickness, or other sought for physical or chemical characteristic to the final composition. For example, zinc naphthenate or manganese linoleate may be incorporated in the composition of this invention as drier for the purpose of regulating the tendency of a paint composition to set or cure.

Pigments, both toxic and non-toxic, may also be utilized in preparing the novel compositions of this invention. The common toxic pigments of copper, mercury, arsenic and tin, for example cuprous chloride, cuprous oxide, mercuric oxide, cupric carbonate, and organotin oxides such as tributyltin oxide are useful in this manner. It will be noted that it may often be desirable to designedly and carefully select a particular combination of toxic pigments for use in an antifoulant composition. For example, a person skilled in the art may choose to combine a plurality of toxic pigments in such a way as to achieve maximum performance, consistent with adequate paint or coating characteristics, against all the organisms normally expected to cause fouling in the area in which the protected surface might be found.

Non-toxic pigments for use as extenders or in obtaining a preferred physical property or color in the final composition include diatomaceous silica, magnesium silicate, mica, Venetian red, Indian red, barytes, precipitated chalk, and the like. Additional pigments such as zinc oxide, magnesium oxide, metallic zinc, iron oxide and the like may also be included in the compositions of this invention. All of these pigments, both toxic and non-toxic, including the benzimidazole complexes described above may be incorporated in the compositions of this invention up to about 60 weight percent of the final composition or more, about 35 to 45 weight percent of pigment being preferable for optimum protection against fouling. The active complexes alone may be used in amounts of from about 2 to about 50 weight percent, but in paints the amount of complex which should be used to obtain the desired antifouling effect is preferably from 20 to 45 weight percent.

The antifouling compositions of this invention may additionally include plasticizers for the purpose of imparting various desirable qualities to compositions containing the active organo metallic complexes described. These include abietate, chlorinated diphenyl, chlorinated rubber, tricresyl phosphate, dehydrated castor oil, coumarone-indene resin, tall oils, paraffin wax, bodied fish oil, linseed oil, tung oil and the like. They may be incorporated into the coating composition by amounts up to about 30 weight percent, preferably from about 2 to about 10 weight percent of the total composition. In any event, the exact amount of plasticizer is not critical to the formulation.

Solvents such as methyl isobutyl ketone and aromatic hydrocarbons for example naphtha and xylene and the like, also find use in some of the compositions of this invention. The amount of solvent used as well as whether a particular carrier, extender, plasticizer or combination thereof is used in a paint or coating composition will depend upon whether the final composition desired be comprised of a water soluble or water insoluble type of matrix. The quantity and kind of ingredient to be employed, however, will be obvious to a person skilled in this art.

Below are illustrative examples of formulations containing the active antifoulant benzimidazole complexes described above.

EXAMPLE 1

|  | Weight Percent | |
|---|---|---|
|  | (1) | (2) |
| Vinyl chloride (86 wt. percent)–vinyl acetate (14 wt. percent) copolymer (Avg. mole. wt., 10,000) | 10 | 8 |
| Grade WW gum rosin | 15 | 12 |
| Tricresyl phosphate | 2 | 3 |
| Titanium dioxide | 16 | 15 |
| Magnesium-calcium silicate | 12.5 | 1 |
| Complex of mercury and 2-(4'-thiazolyl)-benzimidazole | 2.5 | 15 |
| Methyl isobutyl ketone | 30 | 32 |
| Xylene | 12 | 14 |

EXAMPLE 2

Wt. percent
Phenol-formaldehyde resin _____ 11
Coumarone-indene resin _____ 13
Linseed oil (bodied) _____ 10
Tung oil _____ 6
Zinc naphthenate _____ 0.5
Mica _____ 9.5
Diatomaceous silica _____ 9
Naphtha _____ 10
Complex of zinc and 2-(4'-thiazolyl)-5-phenyl benzimidazole _____ 32

EXAMPLE 3

Wt. percent
Grade WW gum rosin _____ 20
Blown linseed oil _____ 10
Naphtha _____ 25
Zinc stearate _____ 1
Complex of mercury and 2-(4'-thiazolyl)-benzimidazole _____ 16
Tributyltin oxide _____ 13
Complex of lead and 2-(4'-thiazolyl)-5-fluoro benzimidazole _____ 15

EXAMPLE 4

Wt. percent
Grade WW gum rosin _____ 26
Paraffin wax _____ 27
Magnesium silicate _____ 8
Complex of mercury and 2-(4'-thiazolyl)-5-methoxy benzimidazole _____ 24
Cuprous oxide _____ 15

EXAMPLE 5

Wt. percent
Grade WW gum rosin _____ 20
Coal tar _____ 5
Coumarone-indene resin _____ 2
Aluminum stearate _____ 1.0
Chlorinated rubber _____ 2
Mineral spirits _____ 11
Naphtha _____ 22
Indian red _____ 10
Complex of mercury and 2-(2'-thiazolyl)-5-(4'-fluorophenyl)-benzimidazole _____ 27

EXAMPLE 6

Wt. percent
Grade WW gum rosin _____ 10
Vinyl chloride (86 wt. percent)–vinyl acetate (14 wt. percent) copolymer (avg. mole. wt., 10,000) ____ 8
Complex of mercury and 2-(2'-thiazolyl)-benzimidazole _____ 47
Methyl isobutyl ketone _____ 30
Tricresyl phosphate _____ 4
Aluminum stearate _____ 1

EXAMPLE 7

In a 5 liter ball mill filled to approximately ½ capacity with high density porcelain balls, 300 grams of 2-(4'-thiazolyl)-benzimidazole, 407 grams of mercuric chloride and 2.5 liters of xylene are mixed and milled for 18 hours giving mercuric - 2 - (4' - thiazolyl)-benzimidazole; M.P. >350° C.

When the above process is carried out and plumbic chloride or zinc chloride is used in place of mercuric chloride, there is obtained plumbic-2-(4'-thiazolyl)-benzimidazole or zinc - 2 - (4' - thiazolyl)-benzimidazole, respectively.

When 2-(2'-thiazolyl)-benzimidazole is used in place of 2-(4'-thiazolyl)-benzimidazole in the above process, mercuric-2-(2'-thiazolyl)-benzimidazole is obtained.

EXAMPLE 8

About 250 grams of 2-(4'-thiazolyl)-5-(4'-fluorophenyl)-benzimidazole and 400 grams of mercuric chloride are added to a 5 liter ball mill containing high density porcelain balls. The mixture is milled for about 22 hours to give mercuric-2-(4'thiazolyl)-5-(4'-fluorophenyl)-benzimidazole.

When the above process is carried out and 2-(4'-thiazolyl)-5-phenyl benzimidazole,
2-(4'-thiazolyl)-5-fluorobenzimidazole,
2-(4'-thiazolyl)-5-methyl benzimidazole,
2-(4'-thiazolyl)-5-(2'-thienyl)-benzimidazole,
2-(4'-thiazolyl)-5-methoxy benzimidazole,
2-(4'-thiazolyl)-5-methylthiobenzimidazole,
2-(4'-thiazolyl)-5-phenyl benzimidazole, or
2-(4'-thiazolyl)-5-phenylthiobenzimidazole is used in place of 2-(4'-thiazolyl)-5-(4'-fluorophenyl)-benzimidazole, there is obtained mercuric-2-(4'-thiazolyl)-5-phenyl benzimidazole,
mercuric-2-(4'-thiazolyl)-5-fluorobenzimidazole,
mercuric-2-(4'-thiazolyl)-5-methyl benzimidazole,
mercuric-2-(4'-thiazolyl)-5-(2'-thienyl)-benzimidazole,
mercuric-2-(4'-thiazolyl)-5-methoxy benzimidazole,
mercuric-2-(4'-thiazolyl)-5-methylthiobenzimidazole,
mercuric-2(4'-thiazolyl)-5-phenoxy benzimidazole, or
mercuric-2-(4'-thiazolyl)-5-phenylthiobenzimidazole, respectively.

EXAMPLE 9

In a three liter resin kettle equipped with reflux condenser, high speed agitation and temperature sensor, 2-(4'-thiazolyl)-benzimidazole (20.2 grams) is dissolved in one liter of 0.2 molar hydrochloric acid. This solution is then brought to a boil and a solution of 27.1 grams of mercuric chloride in one liter of deionized water is added over a 10-minute period. The resulting slurry is then agitated under reflux for one hour and then neutralized with pellets of sodium hydroxide. The buff-colored solid is then washed and isolated as the dry powder. The complex formed has a melting point in excess of 350° C. and assays as mercuric-2-(4'thiazolyl)-benzimidazole (1:1).

EXAMPLE 10

*2-(4'-thiazolyl)-5(6)-phenyl benzimidazole*

18.6 gm. of thiazole-4-carboxylic acid is reflux with 80 ml. of thionyl chloride until HCl evolution ceases. The mixture is then evaporated to dryness in vacuo and the 4-thiazole carboxylic acid chloride added portionwise, as a solid, to a solution of 30.9 gm. of 3-nitro-4-aminobiphenyl in 150 ml. of dry pyridine at room temperature. The mixture is then heated on the steam bath, with stirring, for about 1 hour. The dark homogeneous solution is poured onto ice. The resulting precipitate is filtered off and washed with water, 2.5 N hydrochloric acid, water, saturated sodium bicarbonate solution and finally with fresh water. The solid is recrystallized from acetone to give N-(2-nitro-4-biphenyl)-5-thiazole carboxamide; M.P. 215–217° C.

14.3 gm. of N - (2 - nitro - 4 - biphenyl) - 4' - thiazole carboxamide in 250 ml. of ethanol is reduced with hydrogen at 50° C. using 3 gm. of 5% palladium on charcoal catalyst. The catalyst is then filtered off and washed well with excess boiling ethanol. The combined ethanol solutions are concentrated in vacuo to a volume of about 500 ml. To this solution is added 250 ml. of concentrated hydrochloric acid. A solid precipitates. The mixture is refluxed for 6 hours and then allowed to come to room temperature. The precipitate solid 2 - (4' - thiazolyl) - 5(6)-phenyl benzimidazole hydrochloride is filtered off and suspended in ethanol. An excess of concentrated ammonium hydroxide is added. A precipitate forms. Ethanol is added until a homogeneous solution forms. The solution is treated with decolorizing charcoal and filtered into a large volume of water. The dark gummy precipitate which forms is recrystallized from ethyl acetate to give 2 - (4'-thiazolyl) - 5(6) - phenyl benzimidazole; M.P. 216–217° C.

It should be understood that the other benzimidazole starting compounds defined by Formula I above may be prepared using the detailed procedure of this example either by replacing 3 - nitro - 4 - aminobiphenyl with an appropriately substituted nitroaniline or by using a thiazole carboxylic acid different from thiazole - 4 - carboxylic acid.

The processes described in Examples 9 and 10 above are not embraced by this invention.

It should be understood that although this invention has been described with reference to particular embodiments thereof, changes and modifications may be made which are within its intended scope and it should be limited only by the language of the appended claims.

What is claimed is:

1. A composition useful in combatting marine fouling which comprises vehicle and an anti-fouling effective amount of a complex of an organic base cation selected from the group consisting of plumbic, zinc and mercuric with a compound of the formula

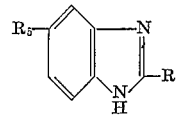

where R is thiazolyl and $R_5$ is selected from the group consisting of hydrogen, loweralkyl, halo, phenyl, halophenyl, thienyl, loweralkoxy, loweralkylthio, phenoxy and phenylthio.

2. A composition useful in combatting marine fouling which comprises an organic base vehicle and intimately dispersed therein about 2 weight percent to about 50 weight percent of a complex of a cation selected from the group consisting of plumbic, zinc and mercuric with a compound of the formula

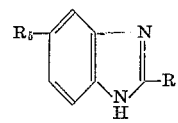

where R is thiazolyl and $R_5$ is selected from the group consisting of hydrogen, loweralkyl, halo, phenyl halophenyl, thienyl, loweralkoxy, loweralkylthio, phenoxy and phenylthio.

3. A composition useful in combatting marine fouling which comprises an organic base vehicle and intimately dispersed therein about 2 weight percent to about 50 weight percent of a complex of mercury with 2 - (4'-thiazolyl) - benzimidazole.

4. A method for combatting the growth of marine organisms on underwater surfaces that comprises treating said surface with a composition comprising an anti-fouling effective amount of an organic base vehicle and complex of a cation selected from the group consisting of plumbic, zinc and mercuric with a compound of the formula

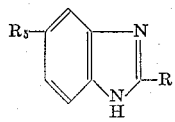

where R is thiazolyl and $R_5$ is selected from the group consisting of hydrogen, loweralkyl, halo, phenyl, halophenyl, thienyl, loweralkoxy, loweralkylthio, phenoxy and phenylthio.

5. A method for combatting the growth of marine organisms on underwater surfaces that comprises treating said surface with a composition comprising an organic base vehicle and about 2 weight percent to about 50 weight percent of a complex of a cation selected from the group consisting of plumbic, zinc and mercuric with a compound of the formula

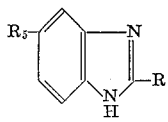

where R is thiazolyl and $R_5$ is selected from the group consisting of hydrogen, loweralkyl, halo, phenyl, halophenyl, thienyl, loweralkoxy, loweralkylthio, phenoxy and phenylthio.

6. A method for combatting the growth of marine organisms on underwater surfaces that comprises treating said surface with a composition comprising an organic base vehicle and about 2 weight percent to about 50 weight percent of a complex of mercury with 2 - (4'-thiazolyl) - benzimidazole.

References Cited

UNITED STATES PATENTS

| | | |
|---|---|---|
| 2,437,170 | 3/1948 | Minich. |
| 2,708,660 | 5/1955 | Jolly. |
| 2,742,369 | 4/1956 | Hatch _____ 106—14 |
| 3,017,415 | 1/1962 | Sarrett et al. ____ 260—299 XR |
| 3,097,132 | 7/1963 | Wiegand et al. _____ 167—330 |
| 3,101,319 | 8/1963 | Rai et al. _____ 260—299 XR |

FOREIGN PATENTS 1,107,850   1/1956   France.

ALEXANDER H. BRODMERKEL, Primary Examiner.

J. B. EVANS, Assistant Examiner.

UNITED STATES PATENT OFFICE
CERTIFICATE OF CORRECTION

Patent No. 3,350,211                                      October 31, 1967

Bernard W. Greenwald

It is hereby certified that error appears in the above numbered patent requiring correction and that the said Letters Patent should read as corrected below.

Column 6, lines 34 and 35, for "which comprises vehicle and an anti-fouling effective amount of a complex of an organic base cation selected" read -- which comprises an organic base vehicle and an anti-fouling effective amount of a complex of a cation selected --; lines 73 and 74, for "said surface with a composition comprising an anti-fouling effective amount of an organic base vehicle and com-" read -- said surface with a composition comprising an organic base vehicle and an anti-fouling effective amount of a com- --.

Signed and sealed this 12th day of November 1968.

(SEAL)
Attest:

EDWARD M. FLETCHER, JR.                          EDWARD J. BRENNER
Attesting Officer                                  Commissioner of Patents